United States Patent
Jain et al.

(10) Patent No.: US 11,550,958 B2
(45) Date of Patent: Jan. 10, 2023

(54) SYSTEM AND METHOD FOR CONFIDENTIAL MULTI-PARTY SOFTWARE IN THE LOOP SIMULATION

(71) Applicant: Robert Bosch GmbH, Stuttgart (DE)

(72) Inventors: Shalabh Jain, Pittsburgh, PA (US); Jorge Guajardo Merchan, Pittsburgh, PA (US); Sven Trieflinger, Renningen (DE); Thomas Huber, Beilstein (DE); Indrasen Raghupatruni, Hemmingen (DE); Santosh Purushothama, Ludwigsburg (DE); Robert Lock, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 17/122,841

(22) Filed: Dec. 15, 2020

(65) Prior Publication Data

US 2022/0188386 A1    Jun. 16, 2022

(51) Int. Cl.
 *G06F 21/62*    (2013.01)
 *G06F 21/12*    (2013.01)
 (Continued)

(52) U.S. Cl.
 CPC ........ *G06F 21/6281* (2013.01); *G06F 21/123* (2013.01); *G06F 21/602* (2013.01); *G06F 21/64* (2013.01); *G06F 21/71* (2013.01); *H04L 9/0819* (2013.01); *H04L 9/0841* (2013.01); *H04L 63/0428* (2013.01); *G06F 2221/0797* (2013.01); *G06F 2221/2149* (2013.01)

(58) Field of Classification Search
 CPC .................................................. G06F 21/6281
 See application file for complete search history.

(56) References Cited

U.S. PATENT DOCUMENTS

| | | | | |
|---|---|---|---|---|
| 2010/0333070 | A1* | 12/2010 | Farnsworth | G06F 11/3457 |
| | | | | 711/170 |
| 2011/0288841 | A1* | 11/2011 | Larsson | G05B 17/02 |
| | | | | 703/8 |

(Continued)

OTHER PUBLICATIONS

I. Damgård, M. Keller, E. Larraia, V. Pastro, P. Scholl and N. P. Smart, "Practical Covertly Secure MPC for Dishonest Majority—Or: Breaking the SPDZ Limits," in Computer Security—ESORICS 2013, Berlin, 2013, 45 Pages.

(Continued)

*Primary Examiner* — Bradley W Holder
(74) *Attorney, Agent, or Firm* — Brooks Kushman P.C.

(57) ABSTRACT

A Software in the Loop (SiL) system and method is disclosed which may include a simulator operable to provide an environment to simulate dynamic systems, enable rapid development, validation of systems, and testing of complex systems. The system and method may include assembling one or more unsecured models operable to simulate the real-world system. The system and method may then encrypt and generate at least one secured model from the one or more unsecured models using a first cryptographic key. The at least one secured model may be decrypted using a sealed decryption key. The decrypted secured model may then be executed within the one or more TEEs. The at least one secured model may be operable to process incoming data and outgoing data.

20 Claims, 6 Drawing Sheets

(51) Int. Cl.
*G06F 21/71* (2013.01)
*G06F 21/60* (2013.01)
*G06F 21/64* (2013.01)
*H04L 9/08* (2006.01)
*H04L 9/40* (2022.01)

(56) References Cited

U.S. PATENT DOCUMENTS

| | | | | |
|---|---|---|---|---|
| 2012/0101791 A1* | 4/2012 | Komatsu | ............... | G05B 17/02 |
| | | | | 703/6 |
| 2014/0019112 A1* | 1/2014 | Canedo | ................. | G06F 30/20 |
| | | | | 703/21 |

OTHER PUBLICATIONS

P. Mohassel and P. Rindal, "ABY3: A Mixed Protocol Framework for Machine Learning," in Proceedings of the 2018 ACM SIGSAC Conference on Computer and Communications Security, New York, NY, USA, 2018, 40 pages.

E. M. Songhori, S. U. Hussain, A. Sadeghi, T. Schneider and F. Koushanfar, "TinyGarble: Highly Compressed and Scalable Sequential Garbled Circuits," in 2015 IEEE Symposium on Security and Privacy, 2015, 18 pages.

D. Bogdanov, S. Laur and J. Willemson, "Sharemind: A Framework for Fast Privacy-Preserving Computations," in Proceedings of the 13th European Symposium on Research in Computer Security: Computer Security, Berlin, 2008, 24 pages.

A. Shamir, "How to Share a Secret," Commun. ACM, vol. 22, p. 612-613, 11 1979, 2 pages.

Website for "Intel SGX," [Available: https://www.intel.com/content/www/us/en/architecture-and-technology/software-guard-extensions.html, Downloaded: Dec. 15, 2020, 5 pages.

ARM, "ARM Security Technology—Building a Secure System usingTrustZone Technology," Industry Whitepaper, 108 pages.

P. Viola and M. Jones, "Rapid object detection using a boosted cascade of simple features," in Proceedings of the 2001 IEEE Computer Society Conference on Computer Vision and Pattern Recognition. CVPR 2001, 2001, 9 pages.

J. Redmon, S. Divvala, R. Girshick and A. Farhadi, "You Only Look Once: Unified, Real-Time Object Detection," in 2016 IEEE Conference on Computer Vision and Pattern Recognition (CVPR), 2016, 10 pages.

Rescorla et al., "The Transport Layer Security (TLS) Protocol Version 1.3", Aug. 2018, ISSN: 2070-1721, 160 pages.

I. Damgård, K. Damgård, K. Nielsen, P. S. Nordholt and T. Toft, "Confidential Benchmarking Based on Multiparty Computation," in Financial Cryptography and Data Security, Berlin, 2017, 18 pages.

* cited by examiner

SYSTEM AND METHOD FOR CONFIDENTIAL MULTI-PARTY SOFTWARE IN THE LOOP SIMULATION

TECHNICAL FIELD

The present disclosure relates to a system and method for a confidential multi-party software in the loop simulation.

BACKGROUND

Software in the Loop (SiL) systems may include test setups where plant models and electronic control unit (ECU) software are run and tested in a pure "virtual" computing or IT environment. Indeed, SiL systems can be designed so that physical components (e.g., sensors, actuators) or target ECU hardware (e.g., vehicle controller) are not even required. SiL simulation may even represent the integration of compiled production source code into a mathematical model simulation that provide engineers with a practical, virtual simulation environment for the development and testing of detailed control strategies for large and complex systems. While various types of SiL systems are known to exist, they are typically employed in limited testing areas. However, as system and software complexity increases within various industries (e.g., the automotive industry) a SiL validation and verification system and method that is operable to reduce development cycle times and to handle the significant increase of distributed software functions to be tested is desirable.

SUMMARY

A system and method is disclosed for securing a software-in-the-loop simulation of a real-world system using one or more trusted execution environments (TEEs). Those skilled in the art would understand that a TEE may include a secure enclave. The system and method may include assembling one or more unsecured models operable to simulate the real-world system. The system and method may then encrypt and generate at least one secured model from the one or more unsecured models using a first cryptographic key. The at least one secured model may be decrypted using a sealed decryption key. The decrypted secured model may then be executed within the one or more TEEs. The at least one secured model may be operable to process incoming data and outgoing data.

The SiL simulation may also be operable to exchange unsecured data over one or more unsecured communication networks. It is contemplated the one or more unsecured communication networks are operable to transmit the unsecured data from an external source, the at least one secured model, or the one or more unsecured models. The TEEs may also be operable to encrypt and exchange secured data over one or more secured communication networks using at least a second cryptographic key. The one or more secured communication networks are operable to transmit the secured data from the external source or the at least one secured model. Lastly, the integrity of the secured data may be verified using one or more attestation digests that are transmitted when the software-in-the-loop simulation is terminated. The attestation digests may also be used to verify the integrity of the secured data transmitted from the at least one secured model.

The TEE may also be operable to encrypt one or more sub-components of the secured model using a secure enclave. Or, a multi-model security enclave may be generated by encrypting at least two of the one or more unsecured models. The secured data may include parameters that are used by the at least one secured model to simulate the real-world system. The secure enclave may be compiled as a dynamic signed library and may include an enclave transition function operable to secure internal interfaces within the at least one secured model. The enclave transition function may also be operable to secure external interfaces between the at least one secured model and the one or more secured communication networks. It is further contemplated that an auxiliary secure enclave may be generated to request the sealed decryption key from a key provisioning host. The sealed decryption key may be obtained from a key provisioning server to decrypt the secure enclave. Lastly, the enclave may be encrypted using a symmetric encryption key (e.g., a AES-128 security key). But it is contemplated that the enclave may be encrypted using other types of cryptographic keys.

The TEE may be operable to isolate and protect an execution state of the at least one secured model from being accessed without approval by the enclave access control or logic. The second cryptographic key may be exchanged between the TEE and another TEE to verify the integrity of the secured data. Or, the second cryptographic key may be obtained from the TEE by an external system for communication with the TEE or between the TEEs. When exchanged externally, the external system may ingest the secured data into its own TEE environment.

DETAILED DESCRIPTION

Figure 1:
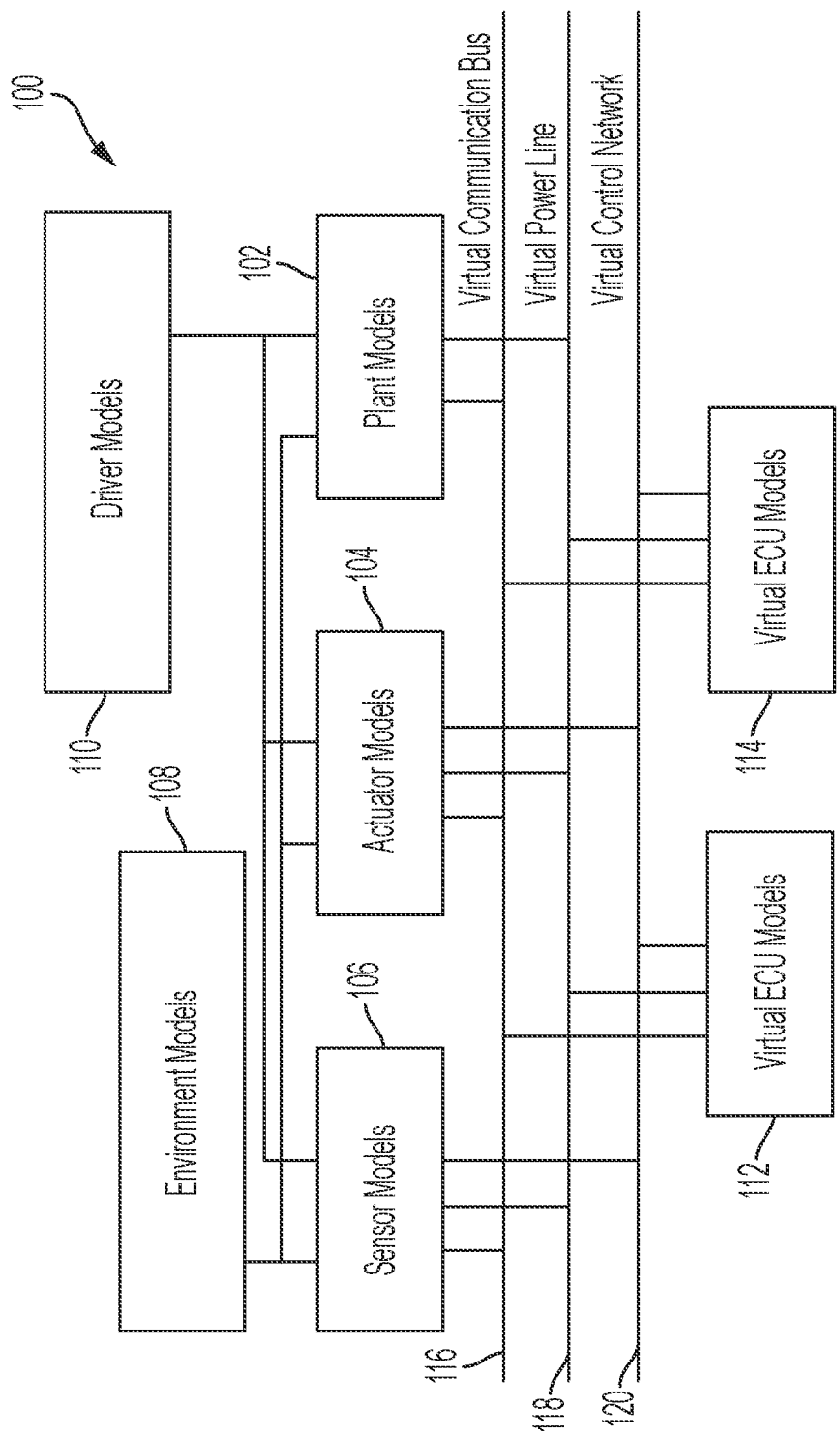
FIG. 1 is an illustrative example of an SiL system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Again, software in the Loop (SiL) systems may include test setups where plant models and electronic control unit (ECU) software are run and tested in a pure "virtual" computing or IT environment. Indeed, SiL systems can be designed so that physical components (e.g., sensors) or target ECU hardware (e.g., vehicle controller) are not even required. SiL simulation may even represent the integration of compiled production source code into a mathematical model simulation that provide engineers with a practical, virtual simulation environment for the development and testing of detailed control strategies for large and complex systems. While various types of SiL systems are known to exist, they are typically employed in limited testing areas. However, as system and software complexity increases within various industries (e.g., the automotive industry) a SiL validation and verification system and method that is operable to reduce development cycle times and to handle the significant increase of distributed software functions to be tested is desirable.

Further, as the automotive industry progresses towards automated/autonomous driving, there may be an increased requirement of real-world testing and continued iterations to design a system that can be approved for commercial deployment. It is contemplated that traditional testing of vehicles (e.g., traditional requirements requiring miles of real-road testing) may not be feasible. Development chains and testing may need to be altered to include SiL systems and methods. And as SiL systems become more complex to handle testing of complex systems, a cooperative development effort from multiple parties (e.g. automotive OEMs, technology providers, automotive suppliers, integrators) may be required. SiL systems may further be desired as a result of their ability to test prototype designs with under-development system components.

For system integrators, like automotive OEMs or suppliers, SiL systems can effectively de-couple the hardware development cycles from the continuous software development process. As a result, SiL systems may enable dependent components to be developed in parallel and tested independently. SiL systems may therefore reduce the requirement of test devices (such as test vehicles) and custom hardware devices that are required for system validation.

One potential drawback to SiL systems is that models and simulation data utilized may consist of proprietary technology that have high business value for the providers and thus require strong protection guarantees. For instance, testing of a complete automotive system may require control systems supplied by automotive OEMs and OEM suppliers. If the OEM supplier is performing the testing using an SiL system, the automotive OEM may require stringent security protections to ensure confidential and proprietary aspects of its controller (e.g., source code) are not made known. As such, the shared usage of SiL platforms between parties may create an environment where it is difficult to guarantee a certain level of protection.

FIG. 1 is an illustrative example of an SiL system 100 that may be deployed in a commercial environment (e.g., automotive). The SiL system 100 may include one or more software representations of various systems that include: plant models 102, actuator models 104, sensor models 106, environment models 108, and driver models 110. The SiL system 100 may further include ECU hardware and software in the form of one or more virtual ECU models 112, 114.

It is contemplated that models 102-114 may be connected over a virtualized communication network 116 (i.e., bus) that operably provides data and control flow paths that implement system specific protocols. It is also contemplated that system 100 may include a virtualized power network 118 that includes other virtualized parameters that influence the functionality of the system. Lastly, a virtualized control network 120 may also be included for providing virtualized control signals to the various models 102-114.

System 100 may operably run on integrator premises or on a virtual cloud platform. It is contemplated a model integrator (or user) may have complete access to the data being transmitted across networks 116-120 and to (or stored) within the code of models 102-114. When system 100 is used on a third-party cloud provider, the infrastructure host of that provider may also have access to the data being transmitted across networks 116-120 and to (or stored) within the code of models 102-114. Thus, security for such system 100 may be based on the trust relationship between the model providers and integrator or the integrator and cloud providers.

A SiL system and method is therefore desirable that includes a simulator operable to provide an environment to simulate dynamic systems, enable rapid development, validation of systems, and testing of complex systems. The SiL system and method may also provide a reduction in the development time and cost associated with traditional iterative and distributed design methodology in varying applications. For instance, the SiL system may provide reduced development time and cost for varying applications (e.g., automotive and aeronautical system designs).

The SiL system may further be operable to protect the models 102-114 when performing SiL simulations. The protections may allow the model provider (e.g., designer of sensor model 106) to exercise complete control over the confidentiality for the IP of a given model. The confidentiality and control may provide security and privacy of sensitive components. Such security and privacy would enable risk-free cooperation between multiple parties. Additionally, such an architecture would allow the integrator to utilize third party cloud services without relying on the security infrastructure of the cloud provider. The SiL system would enhance traditional protection models to enable model protection during simulation runtime, model storage and data ingestion.

It is contemplated the SiL system may operate using one or more privacy-preserving computing technologies (PPCT), operable to protect the confidentiality of model IP and simulation data while allowing utilization of existing processing chains and capabilities. The SiL system may include a secured environment or secured area within a processor (e.g., a trusted execution environment or "TEE") to provide a high level of trust, including security and privacy, when executing simulation code, executing code or accessing data within models, or executing code or transmitting data between models. For instance, the environment may be implemented using an Intel SGX or ARM TrustZone processor that has a secure area within the processor that implements the TEE. Or, it is also contemplated the TEE may be implemented using a combination of TEE and field programmable gate array (FPGA), a FPGA alone, or even one or more application specific integrated circuits (ASIC) or processors such as graphic processing units (GPUs), Intelligence Processing Units (IPUs), or tensor processing units (TPUs). It is therefore contemplated the TEE is not specific to a specific architecture or processing unit and may be adjusted based on the given application.

It is contemplated that the TEE may utilize hardware guarantees to protect the function execution from being inspected, probed, or hacked by unauthorized individuals.

By implementing TEE operability, functions being executed can be trusted as being secure and the integrity of the execution can be guaranteed. Furthermore, data can be stored outside the enclave encrypted by secrets that are generated and only available within the TEE. As such, long-term secure storage of data is contemplated.

Figure 2:
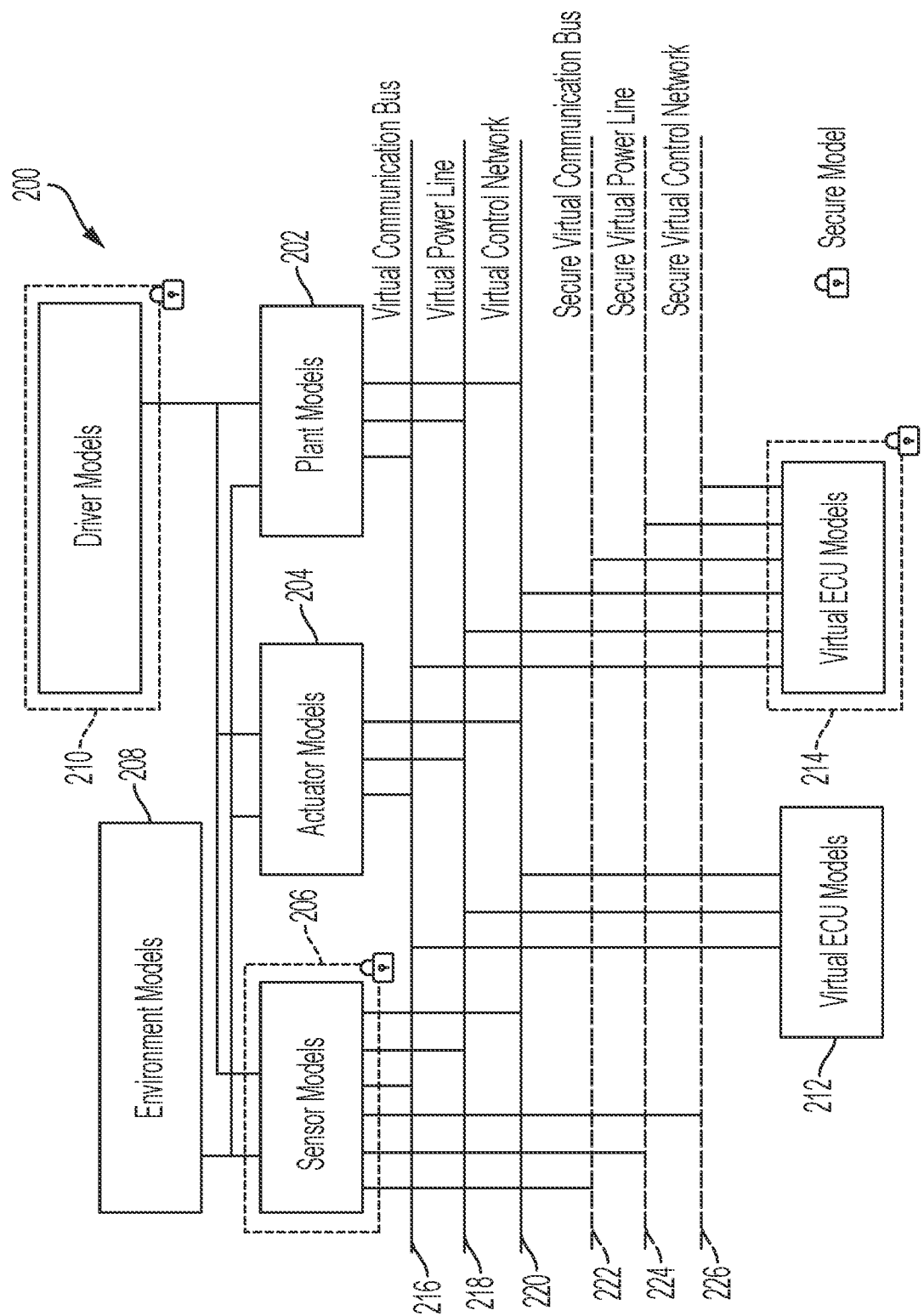
FIG. 2 is an illustrative example of the SiL system that includes a secure trusted execution environments (TEE) architecture.

FIG. 2 is an illustrative example of an SiL system 200 that may be used to provide a secure architecture. The SiL system 200 may include one or more software representations of various systems that include: plant models 202, actuator models 204, sensor models 206, environment models 208, and driver models 210.

SiL system 200 may additionally provide various forms of security and model protection. The security and model protections may be designed to elevate model confidentiality and integrity. The security and model protections can be achieved by encrypting the model code (or binary) with a key that is only available to the provider. The key can be transmitted by the model provider directly to the TEE for decrypting and running the model. Such protections may be utilized for a whole model (e.g. driver model 210 or sensor model 206) or the protections may be utilized for sub-components of a given model (e.g., LiDAR sensor within sensor model 206).

SiL system 200 may also connect models 102-114 over a virtualized communication network 216 (i.e., bus) that operably provides data and control flow paths that implement system specific protocols. System 200 may include a virtualized power network 218 that includes other virtualized parameters that influence the functionality of the system. Lastly, a virtualized control network 220 may also be included for providing virtualized control signals to the various models 202-214.

The SiL system 200 may include various communication security and protections. For instance, the security and communication protections may be applied to data provided as inputs or parameters to the simulation and data exchanged between the models (e.g., between sensor model 206 and ECU model 212) over the secure virtual communication bus 222. The security and communication protections can be achieved by encrypting the transmitted data with keys that are available only to the TEEs that operate on, or use, the data.

The SiL system 200 may further include ECU hardware and software in the form of one or more virtual ECU models 212, 214. As illustrated by the virtual ECU model 214, the SiL system 200 may include various security and protections for each virtual processor. Protection of the virtual ECU model executing on SiL system 200 may be performed using the TEE framework.

Lastly, the SiL system 200 may further include result integrity guarantees to further provide security and protection. For instance, certain systems may require guaranteeing the integrity of the results—i.e., ensuring that the output or processing has not been modified. TEE based implementations may provide such guarantees using attestation of individual model TEEs or attestations of the input data.

It is contemplated that SiL system 200 incorporates a TEE architecture that may include hardware-based isolation and protection of the executing software modules themselves. Such security and protections may be provided by the processor used. However, it is also contemplated that to incorporate the TEE architecture, the SiL system 200 may further require: (1) isolation of modules 202-214 to protect execution state (registers, memory and operations) from external observation or tampering; (2) sealing operability by the TEE using internally secret material to protect data stored on a storage medium (i.e., volatile or non-volatile memory types like hard disks, RAM, or the like); and (3) attestation requiring the ability to demonstrate the execution of a specific functionality within (protected by) the TEE. For instance, attestation can be used to exchange keys between multiple TEEs or send public keys to external parties to ingest data into the TEE.

It is also contemplated that SiL system 200 may be implemented using a virtualized environment. For instance, one or more virtual operating systems (OS) or virtual machines may be allowed to operate SiL system 200 using a hypervisor software or hardware architecture. Or SiL system 200 may operate using an OS-level virtualization to deliver the SiL system 200 in packages or containers using a Docker platform as a service (PaaS) product. (e.g., an operating system (OS) over a hypervisor, a Docker container in an OS, or Kubernetes cluster). Lastly, the SiL system 200 may be provided using other container-orchestration systems for automating the deployment of the SiL system 200 like the Kubernetes platform. When executing the SiL system 200 using a virtualized environment, the TEE architecture may require security guarantees that extend from the hardware through the virtualization layer.

SiL system 200 may also include software modules that can be executed using hardware extensions for providing security functionality (i.e., a TEE). These software modules may need to be prepared in a pre-determined, specified format. The software modules (e.g., "enclaves") may also be operable to perform a restricted set of operations and require additional meta-data or interfaces that can be used to load, execute and transition between the software module and regular operations being performed by the SiL system 200. For instance, SiL system 200 may include one or more enclaves (e.g., Intel SGX enclave) that are compiled as a dynamic signed library. The SiL system 200 may be designed to transition to an enclave using defined interface functions (e.g., "ECALLS" and "OCALLS") which execute specific low-level processor instructions.

It is contemplated that the TEE based architecture (i.e., pure-based TEE architecture) includes a model provisioning process. In the model provisioning process, the models 202-214 of SiL system 200 may interact with a simulation environment and tools through defined interfaces. For instance, the interfaces can either be standards based like Functional Mockup Interface (FMI) used to develop complex cyber-physical systems or the interfaces may be tool-specific interfaces.

It is contemplated that when implementing a model provisioning process, the model provider (i.e., OEM, supplier, or vendor) may be additionally required to implement additional aspects to each model (e.g., models 202-214) being provided. For instance, the model provider may be required to identify sub-components in the model that need to be protected which may be referred to as the "Model-IP." Exemplar Model-IP components may include specific implementation logic, data paths, embedded parameters, or the entire model itself. The model providers may also be required to identify interfaces that are used to interact with the Model-IP. For instance, the model provider of the actuator model 204 may be required to identify that virtual ECU model 214 and sensor model 206 interact with model 204.

Model providers may also need to create an enclave that includes the Model-IP. The enclave may be a processor-based hardware-level isolation or memory encryption that isolates application code and data from being accessed by unauthorized individuals. The model providers may need to create the enclave so that it is operable to extend the required interface functions to include transition into the enclave execution and out of the enclave execution environment. Model providers may further need to include any additional special functionality required to allow for processing of the enclave data. For instance, the model providers may need to include the capability for encryption or decryption of communication or creating and reporting digests of interface data.

Model providers may further be required to protect the enclave confidentiality and integrity using cryptographic meta-data required by the hardware or by the hardware provider. For instance, protection of the enclave confidentiality may be handled by encrypting the enclave image using a cryptographic key and then signing the encrypted image with a key that can be verified by the hardware vendor. It is contemplated that such cryptographic keys may be obtained from a key provisioning server that contains a series of keys (e.g., asymmetric or symmetric keys) designed to encrypt and decrypt data and messages being transferred.

The model provider may also create additional systems and methods to decrypt the model enclave. For instance, the additional systems and methods may include auxiliary enclaves that request the decryption key, or the encrypted (sealed) decryption key. The model provider may further need to create a regular model distributable which may include the remaining model components and extended interface functionality. Lastly, the model provider may need to package the regular models, model parts, and enclave image to obtain the secure model distributable package. Such a secure distributable package may then be utilized by the model integrator during the simulation of the SiL system 200.

Figure 3:
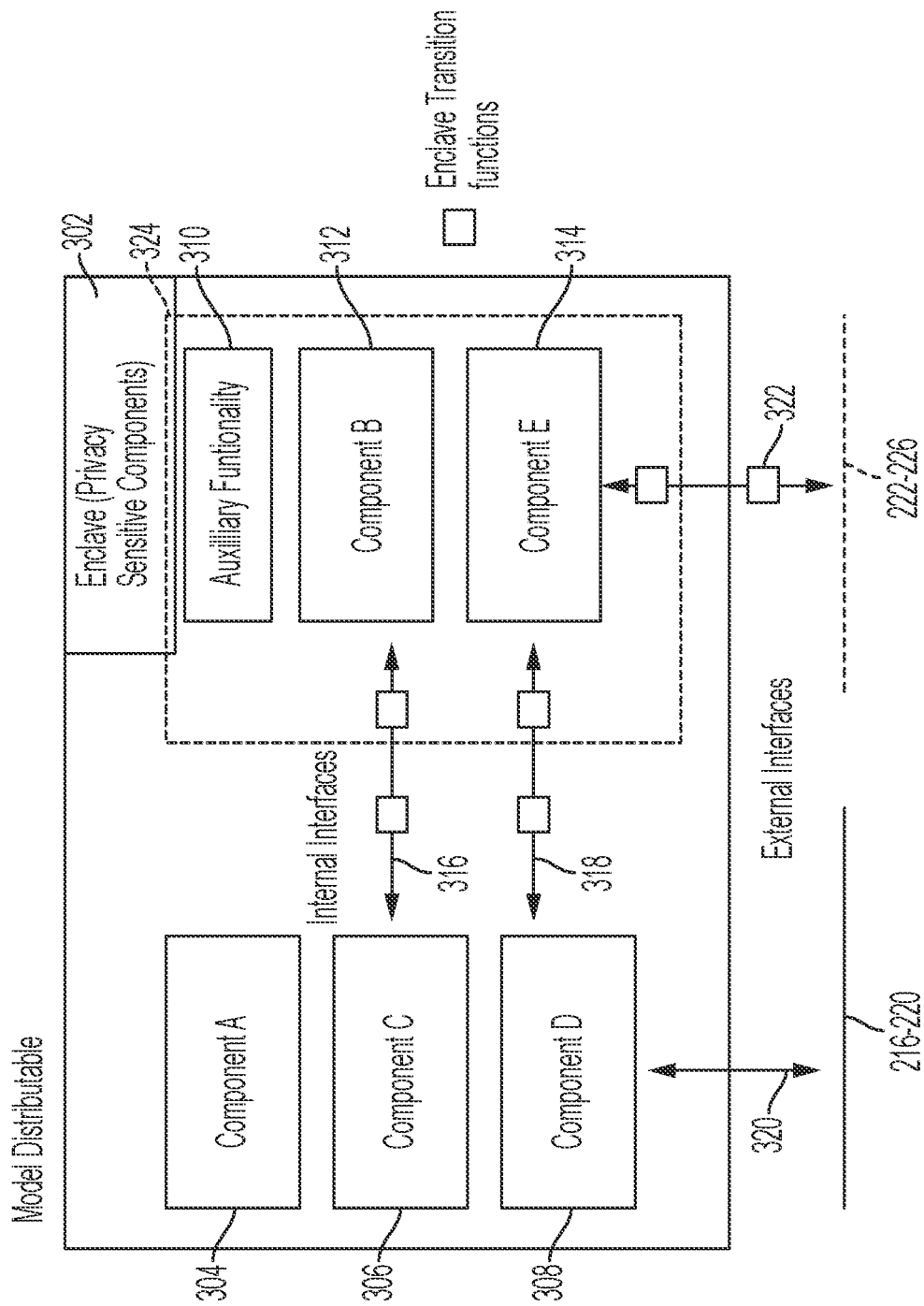
FIG. 3 is an exemplary illustration of a model distributable.

FIG. 3 is an exemplary illustration of a model distributable package 300. The model distributable package 300 may be representative of models 202-214. As illustrated, the model distributable package 300 may include one or more sub-components 304-314. For the model distributable package 300, sub-components 312-314 and auxiliary functionality 310 would need to be identified as being Model-IP (i.e., privacy sensitive components) that would need to be protected within enclave 324.

External interfaces 320, 322 would also need to be identified as external interface (i.e., communications) that may interact with model distributable 302, and more specifically with sub-components 304-314. As shown, external interface 320 would be identified as an interface that would not require interface functions to include transition into and out of the enclave execution environment. As such, interface 320 may be provided across unsecure interface communication channels like virtual communication bus 216, virtual power line 218, or virtual control network 220.

Alternatively, external interface 322 would be identified as an interface that does interact with enclave 314 and therefore requires interface functions to include transition into and out of the enclave execution environment (i.e., enclave transition functions). Likewise, internal interfaces 316, 318 between sub-components 304-308 and sub-components 312-314 and auxiliary functionality 310 would likewise requires interface functions to include transition into and out of the enclave execution environment (i.e., enclave transition functions). As such, interface 322 may be provided across secure interface communication channels like secure virtual communication bus 222, secure virtual power line 224, or secure virtual control network 226.

It is contemplated the enclave 324 may be designed using Intel SGX hardware extensions. It is also contemplated the Model-IP may first be separated, ensuring that it does not contain any system calls. Interfaces 316-318, 322 may be operable to allow transition into and out of the enclave 324. For example, the wrapper code may be operable to use ECALLS and OCALLS that are generated using tools that verify several input-output security conditions before executing the hardware instructions to enter or exit from the enclave 324. Enclave 324 may further be protected using a symmetric encryption key (e.g., an AES-128 security key or AES-256 security key) and signing the encrypted data using a public and private key-pair (e.g., a RSA key-pair) recognized by a hardware owner provisioned key.

Figure 4:
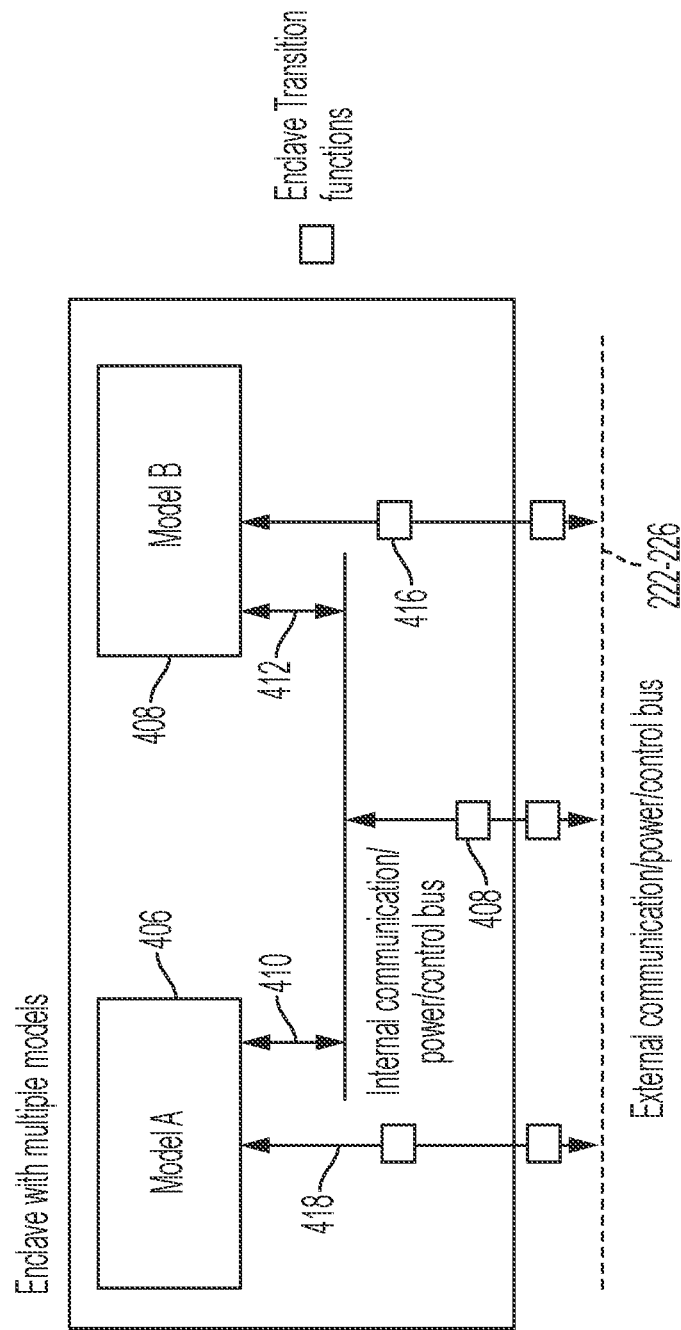
FIG. 4 illustrates an alternative embodiment for model provisioning.

FIG. 4 illustrates an alternative embodiment for model provisioning that may include an enclave 402 that secures two or more models 406-408. It is contemplated the models 406-408 may be models 202-214 illustrated in FIG. 2 or model 302 illustrated in FIG. 3.

Enclave 402 may be designed when a model provider (i.e., OEM that provides model 406) may provide a raw, unsecured model to the integrator. This can be based on existing trust or business relations between the provider and integrator. The integrator (e.g., OEM supplier or vendor) may choose to protect the model(s) 404 or 406 from the execution infrastructure (e.g., third-party cloud provider) by encapsulating the model(s) 404 or 406 within a TEE enclave 402. Since an integrator has an overview of the system architecture and connectivity, it may choose to encapsulate multiple models 404, 406 and their communication interfaces 408, 416-418 within a single TEE enclave 402. By including within a single enclave 402, it is contemplated the efficiency of simulation by SiL system 202 may be improved.

However, it is also contemplated that the two or more models 406-408 may be automatically combined into enclave 402 using a software algorithm or machine learning algorithm based on an analysis of system 200. For instance, the algorithm may analyze various communication patterns between the nodes of models. Based on this analysis, the algorithm may determine the communication between inputs and outputs for given models (i.e., models 406-408) indicate it would be optimal to include both within a combined TEE (i.e., enclave 402). Or, the algorithm may determine that a first set of models (e.g., models 206 and model 210) should be combined into a first enclave and a second set of models (e.g., models 212 and model 214) should be combined into a second enclave based on the communications between the first and second enclave.

It is also contemplated that the enclave 402 may be designed such that a communication interface 408 (that includes enclave transition functionality) may be internally split as separate internal communication interfaces 410-412 that are then provided to both model 406 and 404. Or enclave 402 may be designed such that model 406 and model 404 are designed to communicate between each other using internal communication/power/control bus 410-412.

To encapsulate a single model 402 in a TEE, the process remains the same as defined for the model provider. To encapsulate multiple models (e.g., model 406 and model 404) that communicate with each other, the integrator may first be required to identify models (e.g., model 406 and model 404) that need to be protected and which may be referred to as SubSystem-IP. The integrator may then identify the communication buses (e.g., communication bus 216-22 or secure communication bus 222-226) and interfaces (e.g., interfaces 408 and 416-418) which may be needed for intra-model communication within the SubSystem-IP. Next, the integrator may identify inter-model interfaces (e.g., interface 410-412) or direct interfaces with a given model (e.g., interfaces 316-318) that are used to interact with the SubSystem-IP components.

The integrator may then create enclave 402 that includes SubSystem-IP (e.g., models 404-406) and the communication interfaces (i.e., interfaces 408, 416-418) between SubSystem-IP components. The integrator may also be required to extend interface functions, and the inter-model interfaces and direct interfaces to include transition into and out of the enclave 402 execution environment. To protect the enclave 402 confidentiality and integrity cryptographic meta-data may be included. Such confidentiality and integrity may be performed by encrypting the enclave 402 using a cryptographic key and then signing the encrypted image with a key that can be verified by a hardware vendor. Again, cryptographic keys may be obtained from a key provisioning server that contains a series of keys derived for such purpose. Lastly, the models (e.g., model 406 and model 404), communication interfaces (both encrypted 222-226 and unencrypted 216-220) and enclaves (enclave 402) to obtain the secure system deployable. Such a deployable can typically be utilized by the SiL system 200 (i.e., cloud simulation platform) operable to run and obtain result from a simulation.

Figure 5:
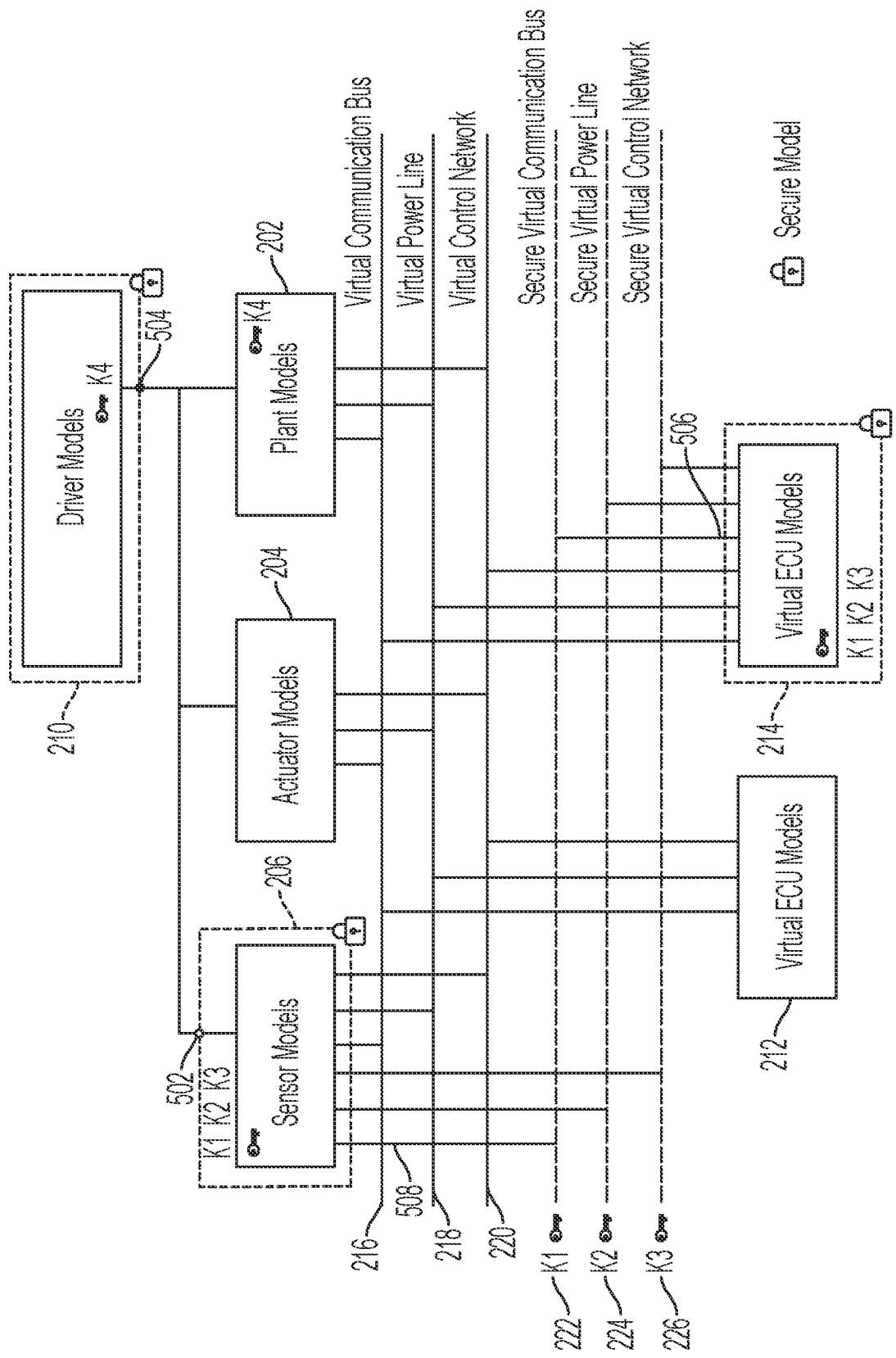
FIG. 5 illustrates an alternative embodiment how the communication within SiL system may be secured between various models.

FIG. 5 illustrates how the communication within SiL system 200 may be secured between various models 202-206, 210-214. As illustrated, the SiL system 200 may include one or more communication interfaces (i.e., virtual communication bus 216, virtual power line 218, or virtual control network 220) that may be used for unsecured communication between various modules 202-214. It is further contemplated that secure communication interfaces (i.e., secure virtual communication bus 222, secure virtual power line 224, or secure virtual control network 226) may be used for secure communications between various modules 202-214. It is also contemplated that the communication between models 202-206, 210-214 may occur over direct connection links, standardized data buses (e.g., a virtual CAN bus for automotive systems), or as inputs/outputs to the SiL system 200. Since input/output data to SiL system 200 may reveal a given structure or details of a model (e.g., model 202), protection of the interfaces used for data-exchange and data input/output to the SiL system 200 may be necessary to protect each of the models 202-206, 210-214.

Enabling protections to the communication interface requires the "secure" communication network (i.e., secure virtual communication bus 222, secure virtual power line 224, or secure virtual control network 226) that as illustrated runs in parallel to the regular unsecured communication network (i.e., virtual communication bus 216, virtual power line 218, virtual control network 220). It is contemplated the secure networks 222-226 may include any point-to-point links or standardized system buses. It is also contemplated the model interfaces that require the secure input/output functionality (e.g., interface 322 of FIG. 3 or interface 408, 416-418 of FIG. 4) may be connected to the secure network (i.e., secure virtual communication bus 222, secure virtual power line 224, or secure virtual control network 226). Otherwise, as explained previously, unsecured interfaces (e.g., interface 320) may be connected to the regular network (i.e., virtual communication bus 216, virtual power line 218, or virtual control network 220). It is contemplated the protection of the data may be dependent on the requirements of the integrator. These protections can be ensured by model providers by enabling secure interfaces during the provisioning stage. However, it is also contemplated that communication 322 may be connected to regular network (i.e., virtual communication bus 216, virtual power line 218, or virtual control network 220) because all connections that go into a given enclave (e.g., enclave 324) do not need to be secure. Instead, it only connections from a secure network (i.e., secure virtual communication bus 222, secure virtual power line 224, or secure virtual control network 226) are required to go into a secure enclave (e.g., enclave 324).

It is further contemplated that secure communication interfaces 222-226 may provide protection for data and information exchanged by connecting the models 202-214 to perform local attestation (between the models) to establish/verify correctness and establish a shared key for each point-to-point link. The system and method of establishing a shared key may depend on the supported functionality in the TEE. For instance, the security may be designed using a system and method of securely exchanging cryptographic keys over a public channel like the Diffie-Hellman key exchange agreement.

For each secure system bus (i.e., secure virtual communication bus 222, secure virtual power line 224, or secure virtual control network 226) shared between multiple nodes (e.g., nodes 502 and 504), models 206, 210 may need to validate their identity by means of local attestation. The models 206, 210 may then use a group key agreement protocol to establish the shared bus key. Again, an example method could be the group Diffie-Hellman key exchange agreement. Lastly, while sending data to the secure interface bus (i.e., secure virtual communication bus 222, secure virtual power line 224, or secure virtual control network 226), the model sending the secure data (e.g., model 206) may first encrypt it using the shared key for the interface. A corresponding model (e.g. model 214) upon receiving the data frame from the transmitting model (e.g., model 206) may decrypt the data using the shared key. It is contemplated that the encryption and decryption of data transmitted between models may be performed using one or more advanced encryption standards (e.g., AES-128) or light or ultra-lightweight block ciphers (e.g., SIMON).

It is contemplated that an alternative communication protection embodiment may include the key agreement between the nodes (e.g., nodes 506, 508) may be altered so that models 206, 214 include one or more secure interfaces to perform remote attestation to the integrator with a description of the interfaces. It is contemplated the integrator, after validating the correctness of the attestation digest (model), may then check if the key for the link associated with the requesting model interface has been generated. If the answer is no, the integrator may generate a new cryptographic key. The integrator may then provide the key to the model (i.e., model 206 or 214) over an established secure channel (e.g., secure virtual communication bus 222). In case the key has been generated, the integrator may provide the key to the model (i.e., model 206 or 214) over the secure channel (i.e., secure virtual communication bus 222). It is contemplated that for secure transmission between the channels can be performed using Such secure channels can be established using protocols for establishing authenticated and encrypted links like a secure socket layer (SSL) or transport layer security (TLS).

It is also contemplated the usage of the key remains same as described by the earlier embodiments. However, since the integrator may have access to the provided keys, it may be operable to view the data by obtaining the transcripts from the SiL system 200 and decrypting the data using the keys. It is therefore contemplated the adversary model for this alternative embodiment may only include the compute infrastructure and not the integrator.

A second alternative communication protection embodiment may include the models (e.g., model 206 and 214) utilize the 'sealing' capability of the enclaves (e.g., enclave 324) to protect the data transferred over secure virtual communication bus 222, secure virtual power line 224, or secure virtual control network 226. It is contemplated that this second embodiment may require all communicating nodes as being operable to derive identical sealing keys. As such, the enclave may be operable to derive a sealing key based on the identity of the enclave creator (signature key).

In the model deployment scenario explained with reference to FIG. 4, all TEEs may need to be signed by the integrator, and thus can derive the same sealing key. The usage of the sealing key for communication protection may be similar to link specific keys (e.g., model 206 may use the sealing key to encrypt any data that is output on the interface 222 and decrypt any data received from the interface 222 transmitted by model 214).

Figure 6:
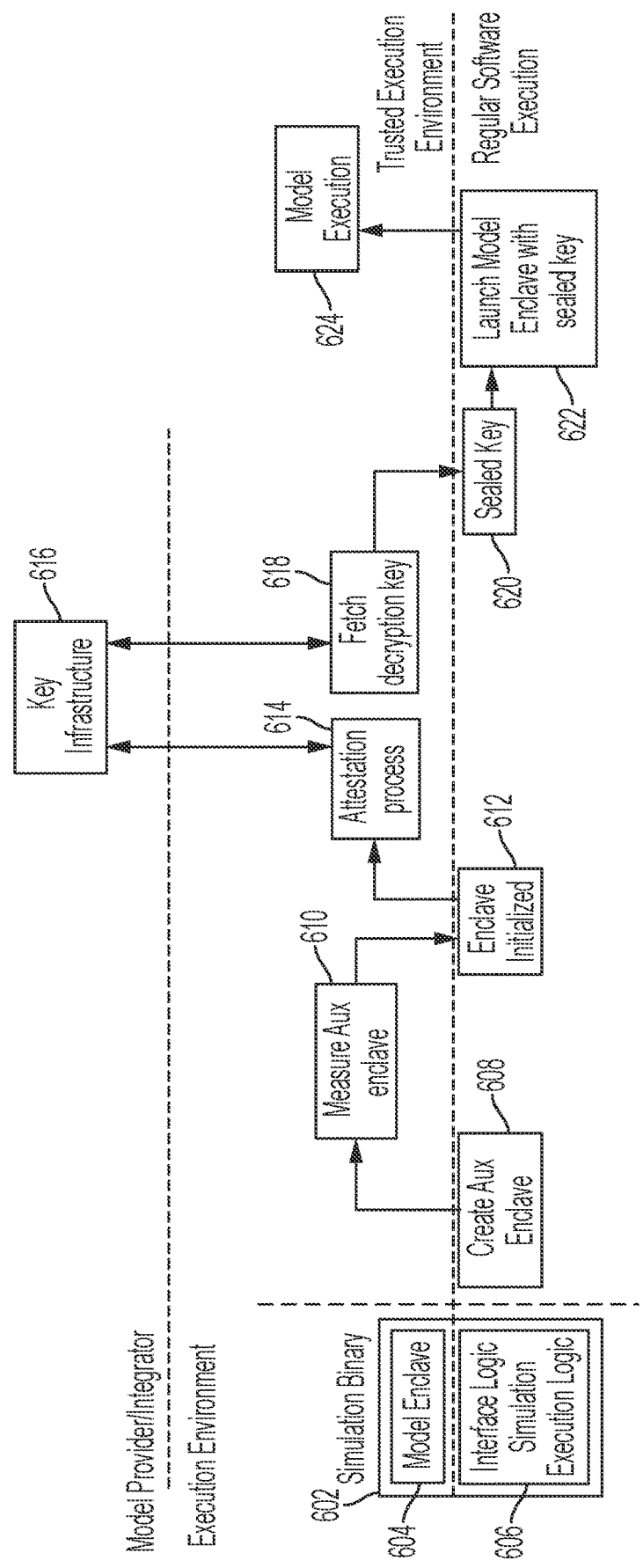
FIG. 6 illustrates how the TEE architecture of SiL system may secure the processing of each model.

FIG. 6 illustrates how the TEE of SiL system 200 may secure the processing of each model 202-214. The secure processing may require model-provisioning and communication protection be performed. For models (e.g., model 214) that are securely provided, sufficient meta-data may need to be provided to the integrator, e.g. interface description of the given model such that the connections and configuration can be performed.

First, the integrator may assemble one or more a simulation binary 602 packages by including the provided models 202-214 and connecting the models 202-214 using the necessary secure interfaces 222-226 and insecure interfaces 216-220. The complete simulation binary 602 may then be packaged as a deployable for simulation by SiL system 200.

While SiL system 200 executes the simulation for each of the models 202-214, the simulation environment may trigger the functionality to load a given model (e.g., model 202) and prepare that model for execution. This may be done using an initialization routine in the model. For a secure model (e.g., model 206), the initialization routine may also be responsible for launch of the model's TEEs. At block 618, SiL system 200 may fetch the decryption key. The decryption key may be used to decrypt the model enclave image (i.e., model enclave 604) and to launch the model TEE. It is contemplated the specific system and method for decrypting the model enclave image may be based on the specifics of the TEE launch capabilities of the platform.

For instance, a TEE architecture (e.g., Intel SGX) may be used where the functionality is provided by the Protected Code Loader (PCL) capability of the Intel launch enclave (LE). Blocks 608-614 illustrate one example of how the TEE may launch an auxiliary enclave that performs remote attestation on the model provisioning entity. At block 606 an auxiliary enclave may be created based on one or more of the model enclaves 604 that are part of the simulation binary 602. Next, the security of the auxiliary enclave may be measured. If the security measures of the enclave are verified, the enclave may be initialized at block 612. At block 614 the auxiliary enclave may perform remote attestation to the model provisioning entity. Upon verification of the attestation digest and execution requirements, the provisioning entity may return the key (i.e., at block 618). Or, as illustrated by block 620, the key may be sealed by the auxiliary enclave. At block 622, the sealed key can be provided to the LE while launching the encrypted model enclave.

At block 624 the SiL system 200 may launch the simulation environment and perform the simulation steps (i.e., execute the model). For each invocation of protected model functionality, the simulator may first invoke the wrapper functionality with the input data. The wrapper may function transition into the model enclave 604 and provide the input data to the model enclave 604. The data is processed within the model enclave 604 and the model outputs are updated. In case the communication link is secure, the model input is decrypted within the model enclave 604 prior to processing and encrypted before updating the output.

Upon termination of the simulation, the simulation environment of SiL system 200 may invoke a model termination wrapper. The model termination wrapper may invoke the platform functionality to terminate the secure enclave and protect any state data which might be needed during future simulations. In case the integrity of the results needs to be guaranteed, the termination wrapper may also compute any required meta-data or digests.

It is also contemplated the integrity of the simulation results may be necessary to ensure the absence of malicious actions by unauthorized parties. It is contemplated that integrity may include the integrity of the model functionality, data inputs, or data outputs. It is also contemplated that wrapping a model as a signed enclave (e.g., models 404 or 406) may provide enough cryptographic guarantees that the enclave code cannot be modified. Further, the protections guaranteed by the hardware platform for TEE execution may be enough to guarantee that a given model (e.g., model 206) cannot be modified during runtime. With the models secured, the integrity of the data as it is transferred between different nodes and the configuration parameters used for the models may be the last aspect of SiL system 200 that may need to be secured.

It is contemplated that data integrity may be verified using various methods. First, every input and output interface for a given model may be required to maintain a digest of the data that is transported over the interface (e.g., data transmitted by model 206 over interface 222). Exemplar digests for an interface may include a hash of the data series that is observed on the interface as shown by Equation (1) below:

$$\text{Digest} = H(\text{digest} \| \text{new data}) \qquad \text{(Equation 1)}$$

where H is a function that satisfies the properties of a cryptographic hash function, e.g. SHA1, SHA3 or HMAC.

Also, it is contemplated that upon invocation of the termination routine, a given model function may send the digest of each interface to the model integrator with the model attestation. The method of providing cryptographically signed interface-digests to the integrator may vary or be altered with the supported functionality of the TEE platform. For each link, it is further contemplated the integrator may verify the attestation digest from each model. The integrator may then verify the digests of all connected interfaces (e.g., interfaces 222-226) to the link (i.e., model 206 and model 214). If all digests match, the integrator may provide a guarantee that the data has not been tampered by unauthorized parties.

For parameter interfaces, the integrator may compute a digest of the parameters that were set for the model. The integrator may then verify the digests that were computed against the received digest. If the digests match, the integrator may be assured that the parameters were not altered by unauthorized individuals. Lastly, for the system inputs and outputs, the integrator may compute a local digest of the input data and output data. The integrator may then verify the digests reported by the models that utilize this data with the local digests to validate the correctness of the system inputs/outputs.

It is contemplated that an alternative embodiment for guaranteeing the integrity results may include each node (e.g., node 502 or 504) have a shared node authentication key in addition to the shared encryption key for the link between the models (i.e., model 206 and 210). This shared node authentication key may be derived independent of the encryption key for the link between models. The shared node authentication key may use the same process as that of the encryption key for the link between models, with different input randomness. Alternatively, the shared node authentication key may be derived using a master shared key by utilizing a hash function. For instance, the shared node authentication key may be derived using Equation (2) below:

$$\text{key\_enc} = H(\text{shared\_key} \| 00), \text{key\_auth} = H(\text{shared\_key} \| 11) \quad \text{(Equation 2)}$$

Where H is a cryptographic hash function such as SHA1 or SHA3. While the keys may be different as described above, it is also contemplated the shared node authentication key and the shared encryption key for the link between the models may be the same.

The alternative method for guaranteeing the integrity results may further include encrypting the data for each node prior to sending the data over a given link. A given model (e.g., model 206) may then compute the cryptographic Message Authentication Code (MAC) on the encrypted data using the shared authentication key. For instance, model 206 may compute the cryptographic MAC using functions like hash-based message authentication codes (HMAC) using a SHA-1 hash function. Integrity results may be guaranteed for each node (e.g., node 502) while receiving the data on the link by first verifying the MAC of the received data. It performs this by computing a local expected MAC using the authentication key and checking this against the received MAC. Lastly, if the data is found to be tampered or accessed by unauthorized parties, the model may request an abort of the simulation being performed by the by providing an appropriate signal to the simulation environment—i.e., the SiL system 200.

It is contemplated the architecture may include a container orchestration solution (e.g. Kubernetes) for scalability and fault tolerance. The container orchestration solution may also be used to replace the 'master-enclave' process described above by providing support for attesting the integrity of an orchestrated cluster of nodes as a whole and the container orchestration solution ensures that only attested nodes can be part of the cluster. Based on the operational environment of the SiL system 200 (e.g., automotive vs. aerospace), different TEEs can be used to implement the described architecture.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), graphic processing units (GPUs), Intelligence Processing Units (IPUs), tensor processing unites (TPUs)state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for securing a software-in-the-loop simulation of a real-world system using one or more trusted execution environments (TEEs), comprising:
    assembling one or more unsecured models operable to simulate the real-world system;
    encrypting and generating at least one secured model from the one or more unsecured models using a first cryptographic key;
    decrypting the at least one secured model using a sealed decryption key; and
    executing the at least one secured model within the one or more TEEs, wherein the at least one secured model is operable to process incoming data and outgoing data.

2. The method of claim 1, further comprising: encrypting one or more sub-components within the at least one secured model includes using a secure enclave.

3. The method of claim 2, wherein the incoming data and the outgoing data includes parameters that are used by the at least one secured model to simulate the real-world system.

4. The method of claim 2, wherein the secure enclave is compiled as a dynamic signed library.

5. The method of claim 2, further comprising: wherein the secure enclave includes at least one enclave transition function operable to secure internal interfaces within the at least one secured model.

6. The method of claim 5, further comprising: wherein the at least one enclave transition function is operable to secure external interfaces between the at least one secured model and one or more secured communication networks.

7. The method of claim 2, further comprising: obtaining the sealed decryption key from a key provisioning server to decrypt a secure enclave image.

8. The method of claim 7, further comprising: creating an auxiliary secure enclave operable to request the sealed decryption key from a key provisioning host.

9. The method of claim 2, further comprising: isolating and protecting an execution state of the at least one secured model from being accessed without approval by an access control mechanism of the secure enclave.

10. The method of claim 2, further comprising: verifying an integrity of the incoming data and the outgoing data transmitted from the secure enclave using one or more attestation digests.

11. The method of claim 1, further comprising:
exchanging unsecured data over one or more unsecured communication networks, wherein the one or more unsecured communication networks are operable to transmit the unsecured data from an external source, the at least one secured model, or the one or more unsecured models; and
encrypting and exchanging secured data over one or more secured communication networks using at least a third cryptographic key that is provided from the one or more TEEs, wherein the one or more secured communication networks is operable to transmit the secured data from the external source or the at least one secured model.

12. The method of claim 11, further comprising: exchanging the third cryptographic key from at least a first of the one or more TEEs and at least a second of the one or more TEEs to verify an integrity of the incoming data and the outgoing data.

13. The method of claim 12, further comprising: obtaining the third cryptographic key from at least a third of the one or more TEEs by an external system; and ingesting the secured data into the external system from the third of the one or more TEEs.

14. The method of claim 1, wherein the software-in-the-loop simulation is implemented using a virtualized operating environment.

15. The method of claim 14, wherein the one or more TEEs are operable to provide a security guarantee between the virtualized operating environment and one or more external hardware components.

16. The method of claim 1, further comprising:
verifying an integrity of the incoming data and the outgoing data using one or more attestation digests that are transmitted when the software-in-the-loop simulation is terminated, wherein the attestation digests are used to verify the integrity of the incoming data and the outgoing data transmitted from the at least one secured model.

17. The method of claim 1, further comprising: generating a multi-model security enclave by encrypting at least two of the one or more unsecured models.

18. The method of claim 1, further comprising: providing the first cryptographic key using a Diffie-Hellman key exchange.

19. A system for securing a software-in-the-loop (SiL) simulation of a real-world system using one or more trusted execution environment (TEEs), comprising:
a memory; and
a processor operable to:
assemble one or more unsecured models operable to simulate the real-world system;
encrypt and generating at least one secured model from the one or more unsecured models using a first cryptographic key;
decrypt the at least one secured model using a second cryptographic key; and
execute the at least one secured model within the one or more TEEs, wherein the at least one secured model is operable to process incoming data and outgoing data.

20. A method for securing a software-in-the-loop (SiL) simulation of a real-world system using one or more trusted execution environment (TEEs), comprising:
assembling one or more unsecured models operable to simulate the real-world system;
encrypting and generating two or more secured models from the one or more unsecured models using at least a first cryptographic key, wherein the two or more secured models are included within at least one of the one or more TEEs;
decrypting the two or more secured model using a second cryptographic key; and
executing the two or more secured models, wherein the two or more secured models are operable to process incoming data and outgoing data.

* * * * *